United States Patent [19]

Okamura

[11] Patent Number: 4,698,566

[45] Date of Patent: Oct. 6, 1987

[54] APPARATUS FOR CONTROLLING MOTOR SPEED

[75] Inventor: Shigeru Okamura, Kawasaki, Japan

[73] Assignee: Canon Kabushiki Kaisha, Tokyo, Japan

[21] Appl. No.: 628,760

[22] Filed: Jul. 9, 1984

[30] Foreign Application Priority Data

Jul. 29, 1983 [JP] Japan .............................. 58-137819

[51] Int. Cl.$^4$ .............................................. H02P 5/00
[52] U.S. Cl. ..................... 318/332; 318/471; 318/434; 318/634; 400/320
[58] Field of Search ............... 318/313, 314, 327, 341, 318/331, 332, 333, 334, 471, 472, 473, 474, 432, 433, 434, 632, 633, 634, 635, 783, 788, 792, 39, 631, 436, 430, 431, 40, 599, 601, 603; 400/320, 322, 317, 317.1, 568, 902, 903

[56] References Cited

U.S. PATENT DOCUMENTS

| 3,136,218 | 6/1964 | Tripp | 318/39 X |
|---|---|---|---|
| 3,527,991 | 9/1970 | Sackin | 318/634 |
| 3,579,073 | 5/1971 | Johnstone | 318/634 |
| 3,590,350 | 6/1971 | Munson | 318/434 X |
| 3,633,081 | 1/1972 | Weber | 318/39 |
| 3,659,176 | 4/1972 | Marshall | 318/631 X |
| 3,735,226 | 5/1973 | Pittner | 318/432 X |
| 3,775,655 | 11/1973 | Du Vall | 318/634 |
| 3,824,440 | 7/1974 | McIntosh | 318/434 X |
| 3,955,130 | 5/1976 | Graf | 318/332 |
| 4,131,838 | 12/1978 | Etoh et al. | 318/603 |
| 4,185,930 | 1/1980 | Umeda et al. | 400/320 |
| 4,189,666 | 2/1980 | Tetsugu et al. | 318/471 X |
| 4,194,129 | 3/1980 | Dumbeck | 318/490 X |
| 4,216,421 | 8/1980 | Dupont | 318/471 |
| 4,226,546 | 10/1980 | Hoffman | 318/603 X |
| 4,317,176 | 2/1982 | Saar et al. | 318/305 X |
| 4,340,848 | 7/1982 | Hanagata et al. | 318/601 X |
| 4,353,020 | 10/1982 | Veale | 318/601 |
| 4,379,986 | 4/1983 | Baxter et al. | 318/434 |
| 4,405,245 | 9/1983 | Fukushima | 400/322 X |
| 4,457,639 | 7/1984 | Nagai | 400/320 X |
| 4,471,443 | 9/1984 | Kinoshita et al. | 318/634 |
| 4,490,796 | 12/1984 | Bigbie et al. | 318/599 X |
| 4,507,002 | 3/1985 | Matsumoto et al. | 400/320 X |
| 4,529,325 | 7/1985 | Moon | 400/320 X |
| 4,541,747 | 9/1985 | Imaizumi et al. | 318/334 X |

FOREIGN PATENT DOCUMENTS

| 0005521 | 1/1979 | Japan | 318/634 |
|---|---|---|---|
| 0123674 | 9/1979 | Japan | 318/634 |

Primary Examiner—William M. Shoop, Jr.
Assistant Examiner—Shik Luen Paul Ip
Attorney, Agent, or Firm—Fitzpatrick, Cella, Harper & Scinto

[57] ABSTRACT

A motor speed control apparatus which is provided with means for performing the control to always apply to a motor a driving force smaller than a frictional load of a driving system which is driven by the motor and to apply to the motor a driving force larger than the frictional force of the driving system when the motor is accelerated.

11 Claims, 5 Drawing Figures

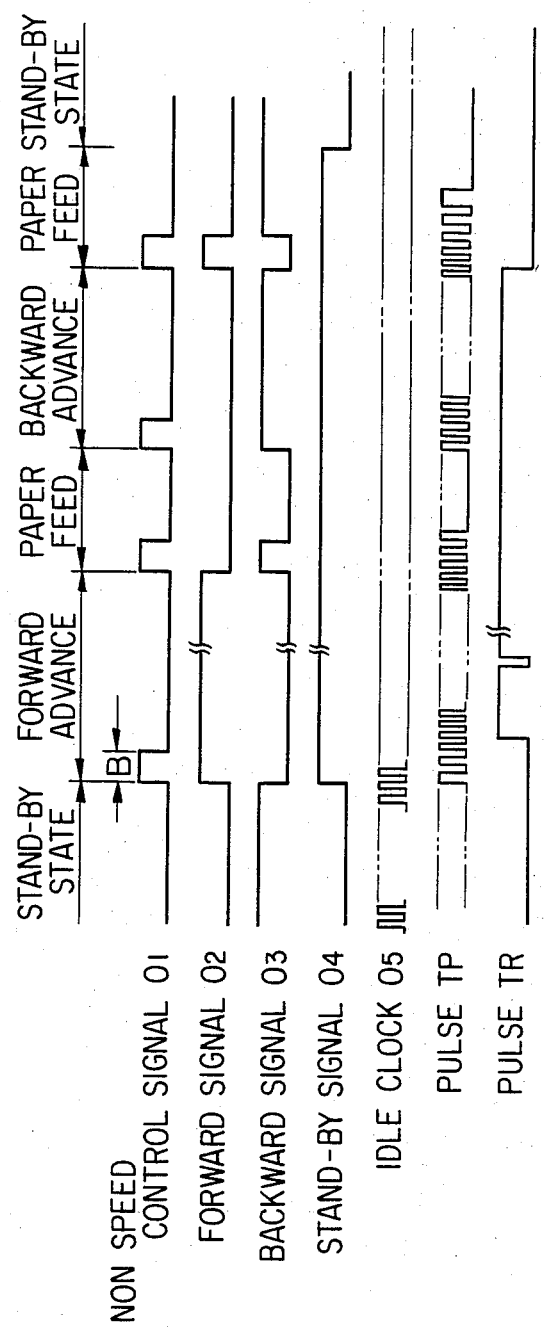

4,698,566

APPARATUS FOR CONTROLLING MOTOR SPEED

BACKGROUND OF THE INVENTION

1. Field of the Invention

The present invention relates to an apparatus for controlling a motor speed and, more particularly, to such an apparatus for controlling the speeds of the members which are driven such as a carriage and the like in a printer apparatus and the like.

2. Description of the Prior Art

Recently, various kinds of printers are used as an output apparatus for a computer and the like. Particularly, in daisy wheel printers, ink jet printers and the like, the printer is generally constituted in the manner such that the sub-scanning is performed by advancing a recording paper by a platen and the printing is done by scanning a carriage on which a print head is mounted along the platen.

With such a constitution, particularly, in the ink jet printer and the like, the speed control of the carriage on which the printing means is installed exerts an influence on the print quality. In the conventional ink jet printer and the like, a method is adopted whereby the speed of a motor to drive the carriage is detected by a photo coupler or the like which is combined with a slit plate and the like, and the motor is reversely rotated when the speed thereof is faster than a normal operating speed value and the motor is turned on when the speed is slower than the object normal operating speed value, thereby making the speed approach the object speed as quickly as possible by performing such speed control and the like.

However, according to this method, the carriage is moved while vibrating from the microscopic viewpoint, so that this makes a cause of occurrence of noise and vibration. In particular, when the printer is used in an office and the like, this noise in operation will be a large problem. To prevent this noise, a method whereby the rigidity of the portion around the driving system is improved is first considered. However, in the recent apparatus in which the small-sized and light-weighted construction is demanded, there is a disadvantage such that the weight thereof increases with an increase in rigidity.

In addition, although a method whereby the sound absorbing material is adhered to the inner wall and the like of the apparatus is considered, this is not an essential solution and there are disadvantages with respect to space use efficiency and manufacturing cost and the like.

SUMMARY OF THE INVENTION

The present invention is made in consideration of the above-mentioned problems and intends to provide a speed control apparatus which can control the speed of a motor with small operation noise and vibration.

BRIEF DESCRIPTION OF THE DRAWINGS

FIG. 4 is a timing chart to explain the operation in the circuit arrangement of FIG. 3.

DETAILED DESCRIPTION OF THE PREFERRED EMBODIMENT

Figure 1:
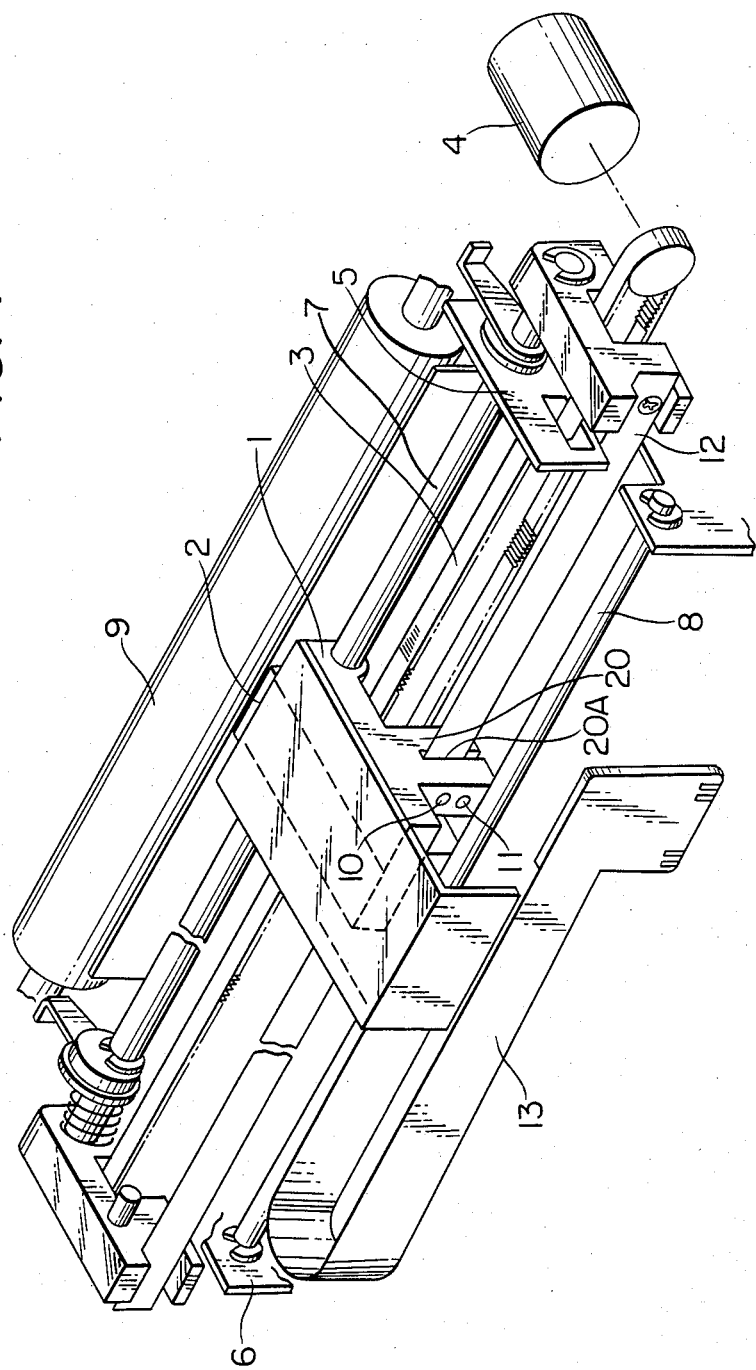
FIG. 1 is a perspective view showing a carriage driving mechanism of a printer apparatus to which the present invention was applied.

The present invention will now be described in detail hereinbelow with respect to an embodiment shown in the drawings.

FIG. 1 shows the mechanical construction of a carriage driving system of an ink jet printer to which the invention was applied.

In FIG. 1, a carriage 1 is supported so as to move on guide shafts 7 and 8 supported by side walls 5 and 6 of right and left frames along a platen 9 which holds a print paper wrapped therearound. An ink jet head 2 as printing means is installed in this carriage 1. The control line of this ink jet head 2 and the output line of a sensor which will be explained later and the like are combined together in a flat cable 13 and are extended from the rear end of the carriage 1.

One end of a drive belt 3 is attached to the carriage 1 and the carriage 1 is scanned by driving this drive belt 3 by a motor 4. A sensor unit 20 projecting downward is provided in the lower portion of the carriage 1. This sensor unit is provided with sensors 10 and 11.

The sensors 10 and 11 are composed of photo couplers and the like and these light sources and photo transistors are disposed on both sides of a groove 20A of the sensor unit 20. When the carriage 1 is moved, these sensors 10 and 11 scan a slit plate 12 which is arranged so as to pass through inside the groove 20A.

The slit plate 12 is the plate member made of Mylar (a trademark) material or the like, and a number of slits are formed therein at regular intervals. The speed and position of the carriage 1 are detected by scanning these slits by the sensors 10 and 11.

Figure 2:
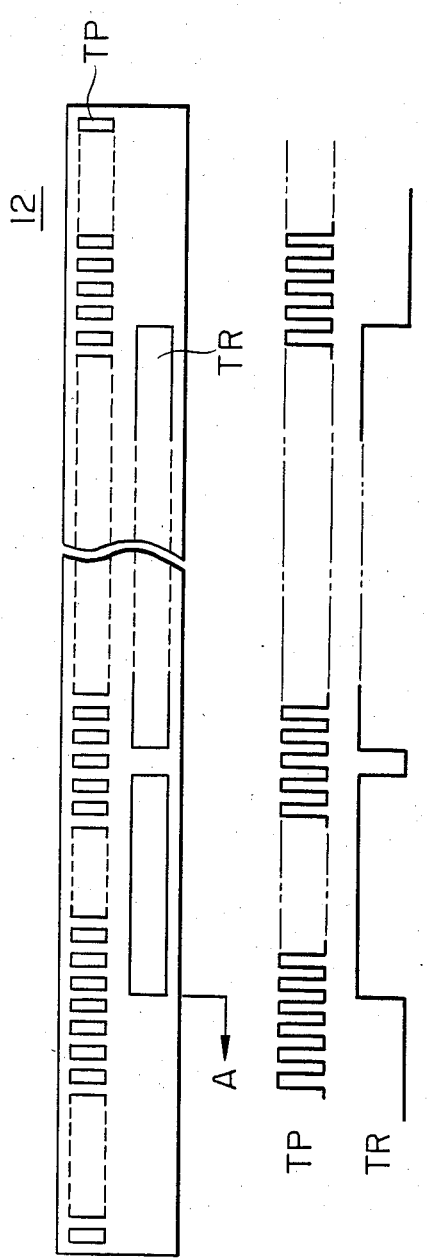
FIG. 2(A) is an explanatory diagram showing a construction of a slit plate in FIG. 1.
FIG. 2(B) is an explanatory diagram showing the output waveforms when the slit plate of FIG. 2(A) was scanned.

FIG. 2(A) shows the constitution of the slit plate 12. As shown in the diagram, two series of slits are formed in this slit plate 12. The upper slits TP between them are relatively thinly formed at regular intervals and are used to detect the speed of the carriage 1. On the other hand, for the lower slits TR, only the slit of the first block is shown for simplicity of illustration, but the whole traveling region of the carriage 1 is divided into several blocks. When the position control is performed at the time of printing, the movement of the carriage 1 is controlled on one block unit basis. The output waveforms when these slits were scanned by the sensors 10 and 11 at a constant speed are respectively indicated by the same reference characters TP and TR in FIG. 2(B).

Figure 3:
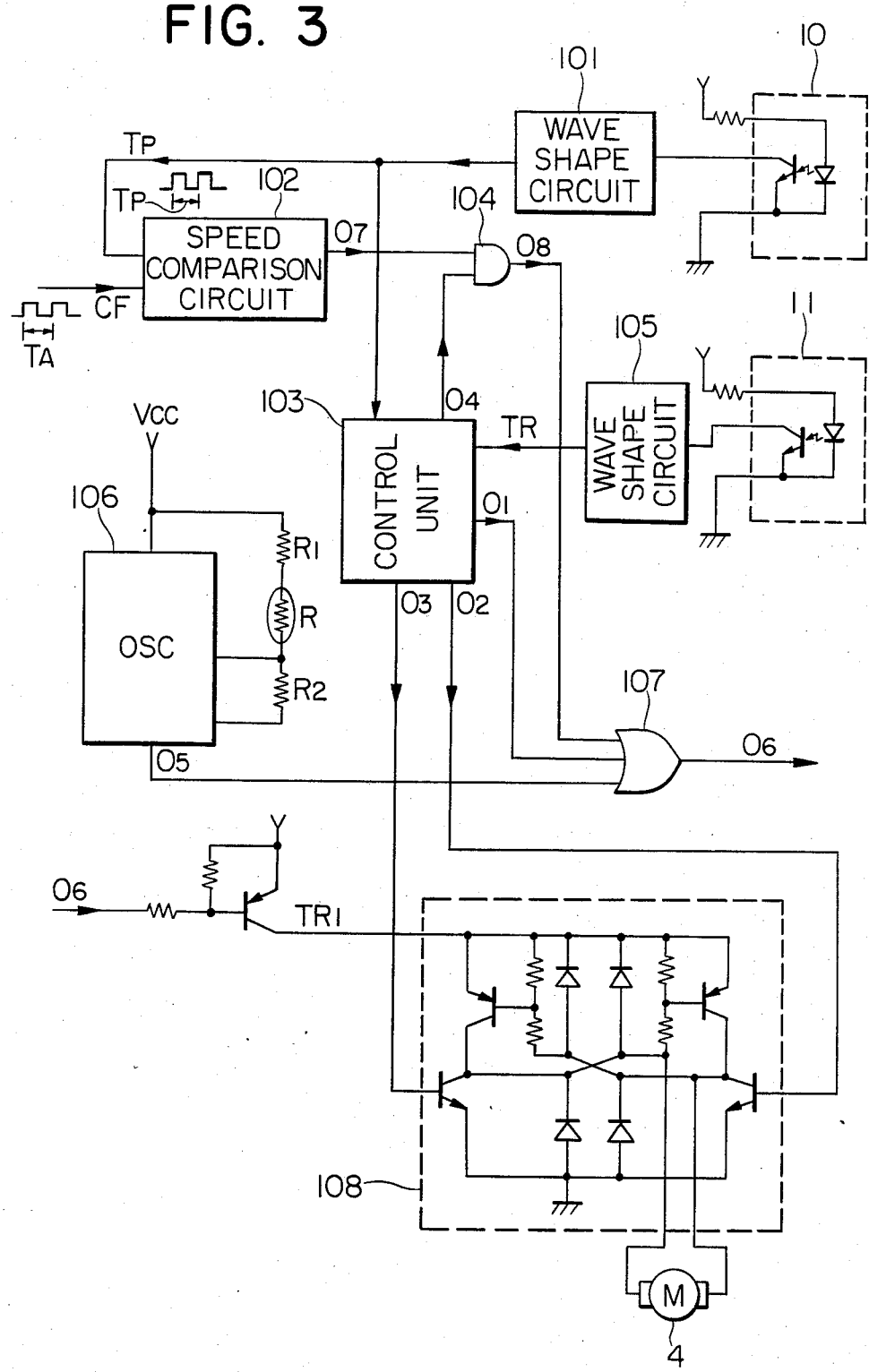
FIG. 3 is a block diagram of a carriage drive control circuit of the printer apparatus to which the invention was applied.

Then, FIG. 3 shows a drive control circuit of the motor 4.

An output of the sensor 10, namely, the pulse TP having the pulse interval $t_P$ is sent through a waveform shaping circuit 101 to a control unit 103 and a speed comparison circuit 102. An objective speed clock CF having the pulse interval $t_A$ corresponding to the objective speed is given to the speed comparison circuit 102.

The speed comparison circuit 102 examines the moving speed of the carriage 1 by comparing the interval $t_P$ of the pulse TP with the interval $t_A$ of the objective speed clock CF. In the case where the interval $t_P$ is shorter than the interval $t_4$, i.e., when the carriage speed is faster than the objective value, an output $O_7$ is set to a low level; on the contrary, when it is slower, the output $O_7$ is set to a high level. Although this output $O_7$ is input to an OR gate 107 through an AND gate 104, the opening and closure of the AND gate 104 are controlled in response to a stand-by signal $O_4$ which is output from the control unit 103.

The control unit 103 is constituted by a logic circuit or a microcomputer and the like. An output of the sensor 11 is input to the control unit 103 through a waveform shaping circuit 105. The output pulse TR of the waveform shaping circut 105 is used in the control unit 103 as a reference pulse for the position control in the printing operation as mentioned before. A NON speed control signal (drive signal irrespective of the speed control) $O_1$ which is output from the control unit 103 is input to the OR gate 107.

An output $O_6$ of the OR gate 107 is input to a motor drive circuit 108 through a switching transistor TR1. The switching transistor TR1 controls the ON/OFF of the motor 4 through the motor drive circuit 108, thereby controlling the drive timing for the carriage 1 and the speed thereof.

In addition, an idle clock $O_5$ which is output from an oscillator 106 is applied to the OR gate 107. The oscillating frequency of the oscillator 106 is controlled by resistors R1 and R2 and a thermistor R. Only the frequency itself of the idle clock $O_5$ can apply to the motor 4 a smaller driving force smaller than the load resistive forces such as friction and the like which the driving system inherently has, and this idle clock $O_5$ is alway applied to the OR gate 107 during operation. Also in this embodimet, the frequency of the idle clock $O_5$ is varied in dependence upon a resistance value of the thermistor R attached in a predeterined portion in the apparatus. A reason of this change is to control the frequency of the idle clock $O_5$ so as to always apply a smaller driving force than the load resistance of the driving system in accordance with such resistance since the load resistance which is mainly determined by the friction of the driving system is varied depending upon temperature.

The motor drive circuit 108 is a well known servo circuit and is composed of transistors, diodes and the like. The circuit drives the motor 4 by inverting the polarity of the voltage to the motor 4 in response to a forward signal $O_2$ and a backward signal $O_3$ which are output from the control unit 103.

The operation in the above-described constitution will be explained in detail with reference to the timing chart of FIG. 4. An example of the bidirectional printing (namely, the printing is also done when the carriage 1 is moved backward) will be described here.

In FIG. 4, the above-mentioned signals $O_1$ to $O_5$ and pulses TP and TR are shown.

In the print stand-by mode, the carriage 1 stands by in the location (indicated by an arrow A in FIG. 2) out of the printing region. In this case, as shown in FIG. 4, only the idle clock $O_5$ is applied to the switching transistor TR1 through the OR gate 107.

At this time, the NON speed control signal $O_1$, forward signal $O_2$ and stand-by signal $O_4$ are set to a low level and only the high-level backward signal $O_3$ is applied to the motor drive circuit 108. Thus, the carriage 1 is driven to the left in FIG. 1 by the idle clock $O_5$ and is come into pressure contact with a damper and the like (not shown) and is stopped. In addition, since the stand-by signal $O_4$ is set to a low level at this time, the speed control by the speed comparison circuit 102 is not performed.

Next, the printing in the forward direction is started at a predetermined timing. At this time, the stand-by signal $O_4$ is set to a high level by the control unit 103 and the AND gate 104 is opened, so that this enables the speed comparison circuit 102 to perform the speed control. Also, the forward signal $O_2$ is set to a high level and the backward signal $O_3$ is set to a low level for the printing in the forward direction, and the NON speed control signal $O_1$ is further set to a high level. The above-mentioned controls are simultaneously performed and this makes the carriage 1 start to move to the right in FIG. 1.

The NON speed control signal is applied to the OR gate 107 for only a predetermined time period B to increase the moving speed of the carriage 1 to a predetermined objective speed. Therefore, the motor 4 is unconditionally continuously driven during this time period B.

When the NON speed control signal $O_1$ comes to a low level, only the idle clock $O_5$ and a signal $O_8$ which is output through the AND gate 104 by the speed comparison circuit 102 are input to the OR gate 107. The speed of the motor 4 is controlled in response to these signals.

Namely, in the case where the speed of the carriage 1 exceeds the objective value and the pulse TP which is output from the waveform shaping circuit 101 is longer than the objective pulse width $t_4$, the speed comparison circuit 102 sets the output $O_7$ to a low level, so that only the idle clock $O_5$ is input to the OR gate 107. As described above, since the idle clock $O_5$ itself can drive the motor 4 with only a smaller driving force than the load resistance of the driving system, the control is performed so as to reduce the moving speed of the carriage 1.

On the contrary, in the case where the speed of the carriage 1 is equal to or less than the objective value, the speed comparison circuit 102 sets the output $O_7$ to a high level, thereby allowing the output of the OR gate 107 to be held at a high level during this interval. Therefore, although the carriage 1 is accelerated by the motor 4, the carriage 1 is accelerated from the state whereby a slight driving force was applied by the idle clock $O_5$, different from the conventional method whereby the carriage 1 is accelerated from the state in which no driving force is applied thereto.

In case of controlling the speed in the manner as described above, in the conventional apparatus, the drive signal is suddenly stopped from the driving state and the drive signal is suddenly applied from the state in that the driving force is zero. However, according to this invention, such sudden operations are not done. Therefore, a microscopic speed change ratio can be made small and the vibration can be slowly diminished, thereby enabling the noise in operation which is caused due to the speed control to be reduced.

On the other hand, since the frequency of the idle clock $O_5$ is controlled depending upon temperature as described above in the foregoing speed control, the speed control doesn't become unstable due to the idle clock, and malfunction doesn't occur.

After the printing of one line has been finished, the carriage 1 is stopped at the final end of the print region and the platen 9 is rotated to feed the paper by one line, thereafter the printing is performed in the backward direction.

To stop the carriage 1, as shown in FIG. 4, the forward signal $O_2$ and backward signal $O_3$ are inverted and the NON speed control signal $O_1$ is set to a high level, thereby braking the carriage 1. At this time, since the accelerating (decelerating) force of the same magnitude as the force at the start of scanning may be applied in the opposite direction, the interval of the NON speed control signal $O_1$ at this time may be the same interval (B) as the start of scanning.

After the paper feeding has been finished, the similar operation as mentioned above is then performed by inverting the backward and forward signals, thereby performing the printing in the opposite direction.

By repeatedly performing the above operations, the bidirectional printing is done and the print position is controlled at this time by the pulse TR which is output from the sensor 11. For example, in the case where the data is finished halfway in the print line, the carriage is moved to the final end of the block indicated by the slit end of the pulse TR and is traveled to the next printing sequence therefrom. On the other hand, in the case where the data output to the printer is finished, the stand-by signal $O_4$ is returned to a low level and the carriage returns to the stand-by mode.

Although the ink jet printer has been explained as an example in the above embodiment, the present invention can be also obviously applied to mechanical apparatuses having other driving systems.

What I claim is:

1. A rotation speed controlled motor apparatus comprising:
   a motor subjected to a frictional load;
   driving means for driving said motor with a drive force corresponding to an input signal;
   means for applying a first input signal to said driving means, the first input signal being of less magnitude than required to rotate said motor;
   means for generating a motor rotation speed signal which is a function of the rotation speed of said motor; and
   means for comparing said motor rotation speed signal with a predetermined signal level to produce a second input signal and applying said second input signal to said driving means in addition to said first input signal during an interval while the motor rotation speed is lower than a target speed, the second input signal being of sufficient magnitude to rotate said motor.

2. Apparatus according to claim 1 wherein the motor is a direct current motor.

3. Apparatus according to claim 1 further comprising:
   means for changing the magnitude of said first input signal in response to temperature of said apparatus.

4. Apparatus according to claim 1, wherein said motor is loaded by a carriage of a typewriter.

5. Carriage shift control apparatus comprising:
   a carriage subjected to a load resistance;
   a motor arranged to shift said carriage;
   detection means for detecting the shift speed of said carriage;
   comparing means for comparing the carriage shift speed detected by said detection means with a target speed; and
   control means for changing the drive force of said motor in accordance with the comparison result obtained by said comparing means;
   said control means being constructed and arranged to change the motor drive force between two drive force levels,
   one of said drive force levels being greater than the load resistance of said carriage and the other drive force level being less than the load resistance of said carriage.

6. Apparatus according to claim 5, wherein said control means is further constructed and arranged to apply the two levels of drive force to said motor during an idling operation.

7. Apparatus according to claim 9, wherein said motor is a direct current motor.

8. In a motor drive apparatus the combination of:
   drive force applying means for applying to a motor subjected to a frictional load resistance which varies with temperature, a drive force smaller than the force needed to overcome the frictional load on the motor during idling thereof; and
   control means constructed and arranged to control the drive force applied by said drive force applying means according to the temperature of said frictional load resistance.

9. A combination according to claim 8, wherein said drive force applying means is constructed and arranged to apply a drive force to a direct current motor.

10. A combination according to claim 8, wherein said control means inludes a thermally sensitive resistor.

11. A combination according to claim 8 wherein said motor is loaded by a carriage of a typewriter.

* * * * *

UNITED STATES PATENT AND TRADEMARK OFFICE
CERTIFICATE OF CORRECTION

PATENT NO. : 4,698,566

DATED : October 6, 1987

INVENTOR(S) : SHIGERU OKAMURA

It is certified that error appears in the above-identified patent and that said Letters Patent is hereby corrected as shown below:

COLUMN 1

Line 10, "carraige" should read --carriage--.
    Line 32, delete "object".
    Line 45, "light-weighted" should read --light-weight--.

COLUMN 3

Line 30, "smaller" (second occurrence) should be deleted.
    Line 32, "alway" should read --always--.
    Line 34, "embodimet," should read --embodiment,--.
    Line 44, "well known" should read --well-known--.
    Line 67, "is come" should read --comes--.

COLUMN 4

Line 55, "that" should read --which--.

UNITED STATES PATENT AND TRADEMARK OFFICE
CERTIFICATE OF CORRECTION

PATENT NO. : 4,698,566

DATED : October 6, 1987

INVENTOR(S) : SHIGERU OKAMURA

Page 2 of 2

It is certified that error appears in the above-identified patent and that said Letters Patent is hereby corrected as shown below:

COLUMN 6

```
Line 3,  "1 wherein" should read --1, wherein--.
Line 5,  "1 further" should read --1, further--.
Line 32, "claim 9," should read --claim 5,--.
Line 48, "inludes" should read --includes--.
Line 49, "8 wherein" should read --8, wherein--.
```

Signed and Sealed this

Tenth Day of May, 1988

Attest:

*Attesting Officer*

DONALD J. QUIGG

*Commissioner of Patents and Trademarks*